United States Patent [19]
Sprague et al.

[11] Patent Number: 6,043,821
[45] Date of Patent: Mar. 28, 2000

[54] METHOD AND APPARATUS FOR RENDERING PIXEL INFORMATION FROM BLENDED TEXTURE MAPS

[75] Inventors: Mark A. Sprague, Bolton, Mass.; Richard J. Fuller, Nashua, N.H.

[73] Assignee: ATI Technologies, Inc., Thornhill, Canada

[21] Appl. No.: 08/885,679

[22] Filed: Jun. 30, 1997

[51] Int. Cl.$^7$ ...................................................... G06T 7/40
[52] U.S. Cl. .......................... 345/430; 345/113; 345/523; 382/308
[58] Field of Search ................................... 345/430, 113, 345/523; 382/308

[56] References Cited

U.S. PATENT DOCUMENTS

| | | | |
|---|---|---|---|
| 4,855,934 | 8/1989 | Robinson | 364/521 |
| 5,459,823 | 10/1995 | Silverbrook et al. | 345/431 |
| 5,767,858 | 12/1995 | Kawase et al. | 345/430 |
| 5,870,102 | 4/1998 | Tarolli et al. | 345/430 |

OTHER PUBLICATIONS

Mike Morrison, "The Magic of Image Processing", Sam's Publishing, p. 39 and 43, 1993.
POV–Ray for Windows, 1996.

*Primary Examiner*—Mark R. Powell
*Assistant Examiner*—Chante' Harrison
*Attorney, Agent, or Firm*—Markison & Reckamp, PC

[57] ABSTRACT

A method and apparatus for rendering pixel information from blended texture information is accomplished by generating first texture information and second texture information for a given pixel location. Having generated this information, the first and second texture information is blended, based on a blending function, to produce blended texture information. The blended texture information is then used to render the pixel information at the given pixel location. This process continues for each pixel location of an object element of an object, image, and/or scene.

18 Claims, 6 Drawing Sheets

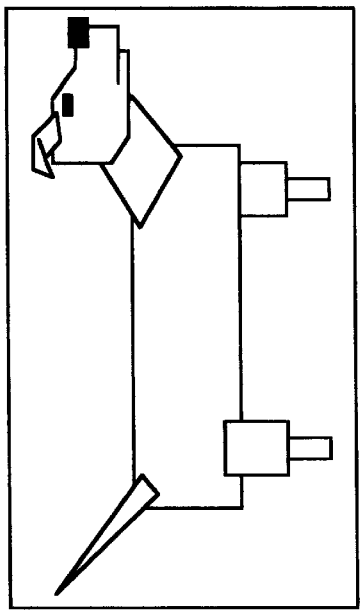
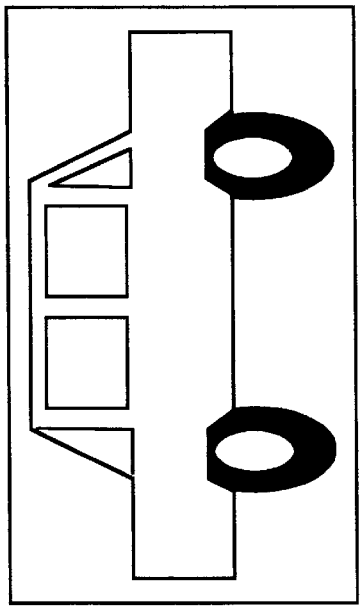
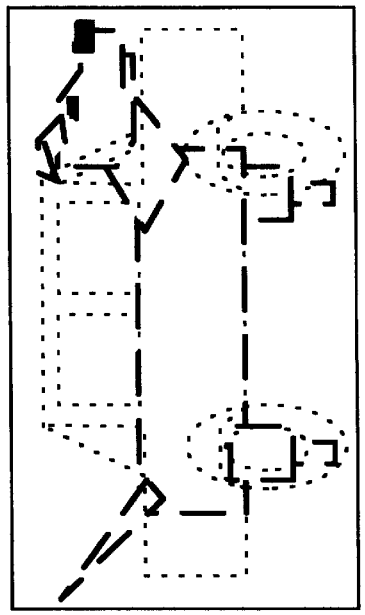
Figure 3

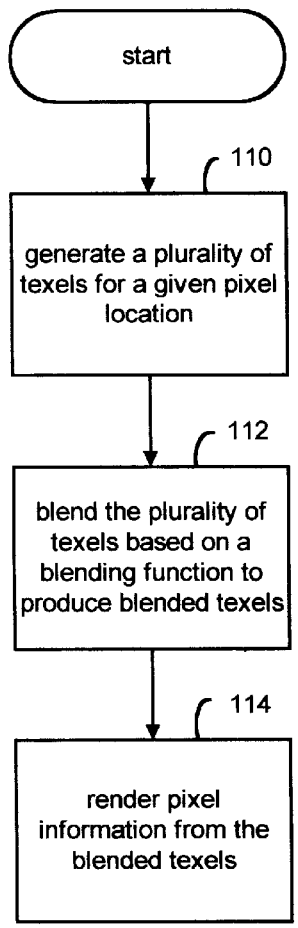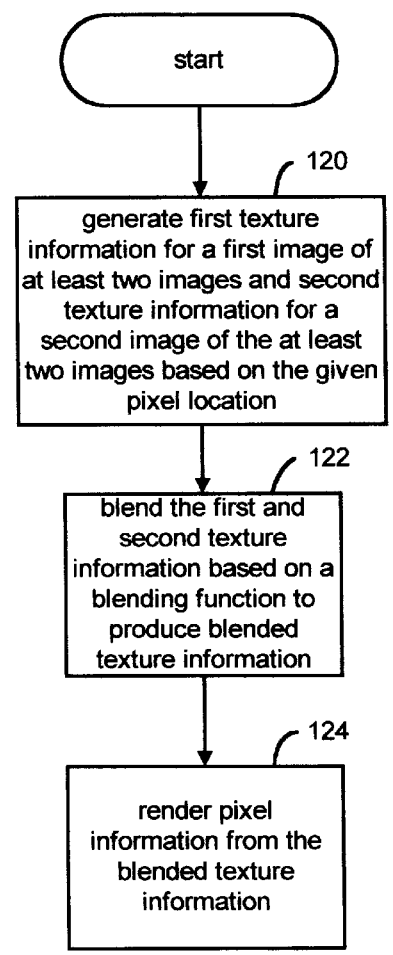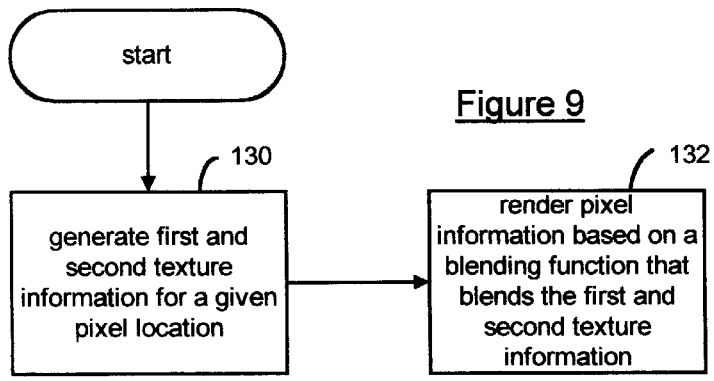
Figure 7
Figure 8
Figure 9

METHOD AND APPARATUS FOR RENDERING PIXEL INFORMATION FROM BLENDED TEXTURE MAPS

TECHNICAL FIELD OF THE INVENTION

This invention relates generally to video graphics processing and more particularly to rendering pixel information from texture maps.

BACKGROUND OF THE INVENTION

Computers are known to include a central processing unit ("CPU"), cache memory, hard drive memory, disk memory, video graphics circuitry, and audio processing circuitry. The video graphics circuitry is operably coupled to a computer screen such that images, objects, and/or scenes, which the CPU has processed and/or generated, may be displayed. Such images, objects, and/or scenes, are stored as a plurality of triangles, where the number of triangles varies greatly depending on the object, image, and/or scene. For example, if a square is being presented, it may be represented by two triangles, while a human face may include more than 20,000 triangles. Each triangle of an object, image, and/or scene, has associated therewith vertex parameters which include Red, Green, and Blue ("RGB") parameters, X, Y, and Z parameters, texture parameters ("STW") and/or alpha parameters. The RGB parameters indicate the particular color at a given vertex of a triangle; the X and Y parameters indicate the particular location of the vertex in two-dimensional space of the computer screen; the texture parameters indicate the texture being applied to the triangle; and the alpha parameters indicates the translucency of the triangle.

A scene may be altered by adding visual effects to the scene such that it may be portrayed in different veins. For example, assume that a scene of a city alley is being presented on the computer screen which may be portrayed in different veins depending on the time of day. If the time of day is noon, the alley should be bright, but, if the time of day is midnight, the alley should be dark. To render the noontime effects of the alley, a noontime texture map is rendered with the image data of the alley. Similarly, to render the midnight effects on the alley, a midnight texture map is rendered with the image data of the alley.

If the alley scene is to be displayed for a different time of day, the computer could store a texture map for each different time of day. Thus, for the particular time of the day, the computer would retrieve the appropriate time of day texture map and render it with the image data of the alley. While this technique works, it is somewhat impractical due to the amount of memory it would take to store so many time of day texture maps. To overcome this impractical memory requirement, most video graphics circuits only stores the noon time and midnight texture maps. When the visual effects for a different time of day are desired, the image data is first rendered with the noontime (or midnight) texture map, where the resulting pixel information is stored in the frame buffer. Having done this, the frame buffer is read and the retrieved pixel information is rendered with the midnight (or noontime) texture map to achieve the desired affect. Once the final pixel information is rendered, it is stored in the frame buffer and subsequently displayed.

Thus, to render a scene with two texture maps to achieve a combined effect, the CPU and/or the video graphics circuitry is required to write pixel information into the frame buffer twice, which adds traffic to the data and address buses. By increasing the traffic on the data and address buses, the overall efficiency of the computer is reduced. This problem is even greater when more than two texture maps are used to render the scene.

Therefore, a need exists for a method and apparatus that has the CPU and/or the video graphics circuitry rendering pixel information into the frame buffer only once, regardless of how many texture maps are used to render a particular image, object, and/or scene.

BRIEF DESCRIPTION OF THE DRAWINGS

FIG. 3 illustrates a graphical representation of blending texture information to achieve a morphed image in accordance with the present invention;

FIG. 7 illustrates yet another logic diagram for blending pixels in accordance with the present invention;

FIG. 8 illustrates a logic diagram for blending texel information to produce a morphed image in accordance with the present invention; and FIG. 9 illustrates a logic diagram for blending texture information in accordance with the present invention.

DETAILED DESCRIPTION OF THE DRAWING

Generally, the present invention provides a method and apparatus for rendering pixel information from blended texture information. This may be accomplished by generating first texture information and second texture information for a given pixel location. Having generated this information, the first and second texture information is blended, based on a blending function, to produce blended texture information. The blended texture information is then used to render the pixel information at the given pixel location. This process continues for each pixel location of an object element of an object, image, and/or scene. With such a method and apparatus, the present invention has the CPU, and/or video graphics processing circuit writing pixel information to the frame buffer only once regardless of the number of texture maps being used to render pixel information.

Figure 1:
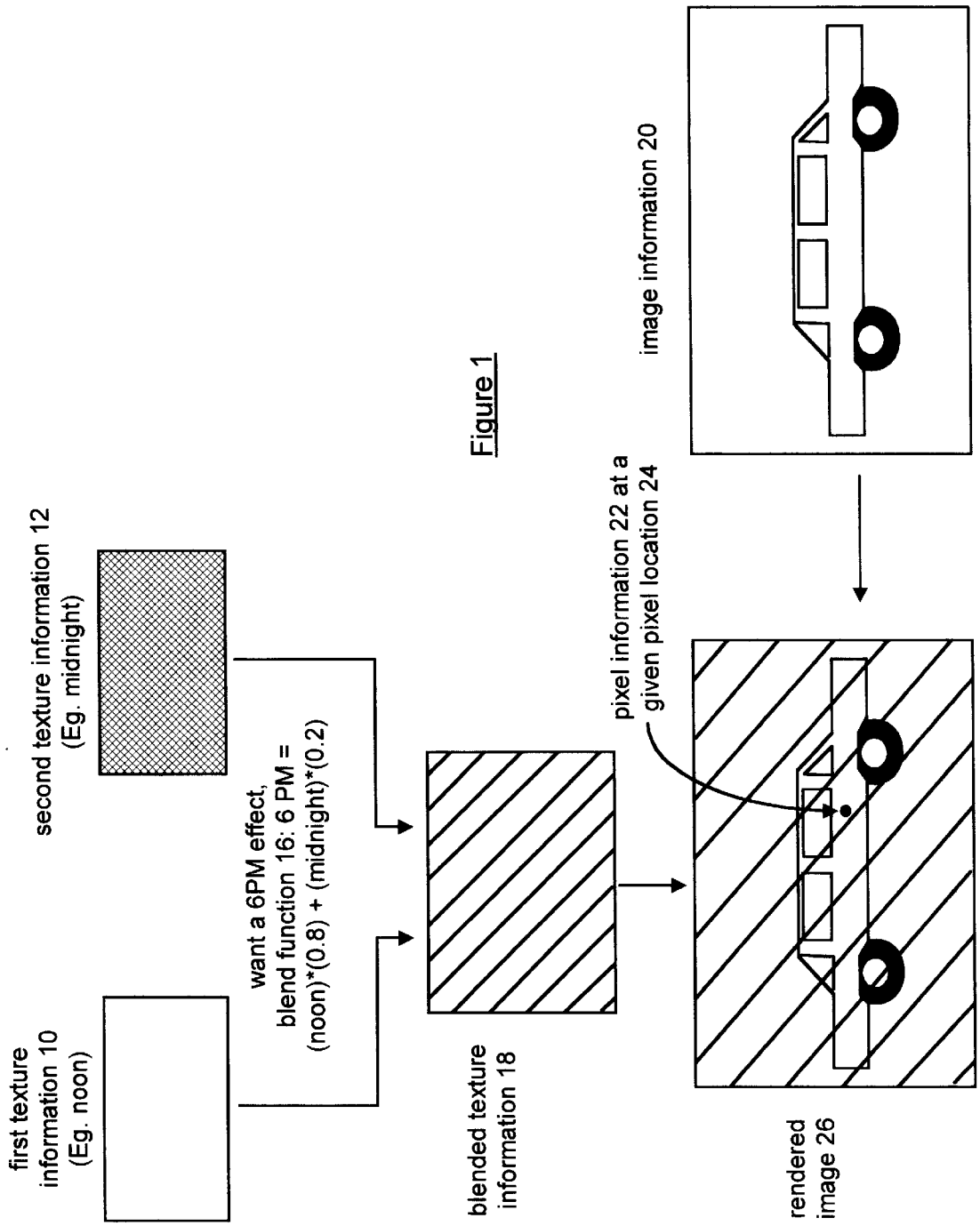
FIG. 1 illustrates a graphical representation of blending texture information in accordance with the present invention.

The present invention can be more fully described with reference to FIGS. 1 through 9. FIG. 1 illustrates a graphical representation of first texture information 10 and second texture information 12 being blended together to produce blended texture information 18. The image information 20 is then rendered with the blended texture information to produce the rendered image 26. The first texture information 10 and the second texture information 12 are blended together based on a blending function. Such a blending function may be a function of: (first texture information)*x+(second texture information)*(1−x), where x is at least one of a constant, a variable, or a function.

As an example, assume that the first texture information 10 is representing a texture map illustrative of noontime affects, while the second texture information 12 is a texture map illustrating midnight effects. Further assume that the desired effect is a 6:00 p.m. effect. Thus, the blending function 16 may equal the noon time texture map times 0.8 plus the midnight texture map times 0.2. From this information, the blended texture information 18 is created. As one skilled in the art will readily appreciate, the blending of the first and second texture information 10 and 12 is done on a pixel by pixel basis.

The blended texture information 18 is then rendered with the image information 20 to produce the rendered image 26. The rendering of the blended texture information 18 and the image information 20 is done pixel by pixel for each pixel location of the rendered image 26. As shown, pixel information 22, is generated at a given pixel location 24, wherein the pixel information 22 is based on the blended texture information 18 and the image information 20 corresponding to the given pixel location 24.

The first texture information 10 and the second texture information 12 may also be texture maps of color patterns, highlights, reflections in water, clouding or fogging, separate objects, shading and/or any other visual affect. Thus, the blended texture information 18 may produce a wide variety of effects upon the image information 20. For example, if the first and second texture information 10 and 12 are water reflections from different light sources, i.e., one being representative of a sunny day, the other being representative of a cloudy day, then the blended texture information 18 would be a combination of the two different reflection texture maps. The blended texture information 18 would then be rendered with the image information 20 to produce the rendered image 26.

The first texture information 10 and the second texture information 12 may also be a plurality of texels. As such several texels from each of the first texture information 10 and second texture information 12, may be blended, via the blending function, to produce the blended texture information 18. The blended texture information 18, in conjunction with the image information 20, is used to render the image 26. When the first and second texture information 10 and 12 are a plurality of texels, the blending function is $\Sigma(\text{texel}_i)^* x_i$ where $\Sigma x_i = 1$ and where x is at least one of: a constant, a variable, and a function.

Figure 2:
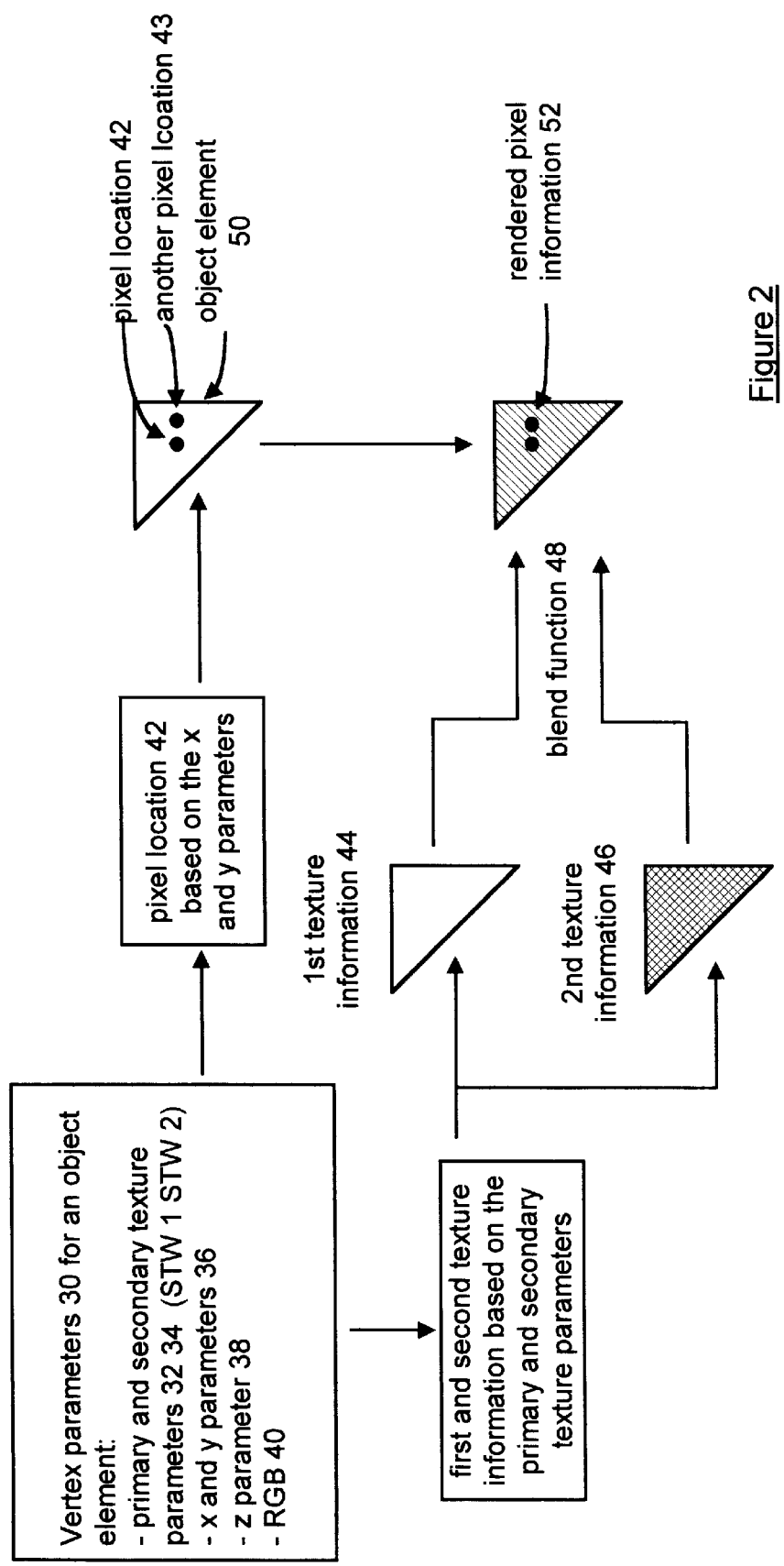
FIG. 2 illustrates another graphical representation of blending texture information in accordance with the present invention.

FIG. 2 illustrates a graphical representation of rendering an object element 50 from first and second texture information 44 and 46. As shown, vertex parameters 30 are received for an object element 50 which may be a triangle, or other polygon, wherein a plurality of object elements make up an image, object, or scene that will subsequently be displayed on a computer screen. The vertex parameters 30 include primary and secondary textures parameters 32 and 34 (STW 1, STW2), x and y parameters 36, z parameters 38, and RGB parameters 40. The vertex parameters may also include alpha parameters for producing a translucent affect.

From the primary and secondary parameters 32 and 34, the first and second texture information 44 and 46 are created. The primary and secondary texture parameters 32 and 34 are representative of the texture parameters for each texture map, or plurality of texels, that are being blended together. The primary and secondary texture parameters 32 and 34 are generated from the vertex parameters 30 via a setup engine and edgewalker circuit. A more detailed description of the setup engine and edgewalker circuit can be obtained in co-pending patent application having a application Ser. No 08/846,000 filed Apr. 30, 1997, entitled METHOD AND APPARATUS FOR THREE DIMENSIONAL GRAPHICS PROCESSING, assigned to the same assignee as the present invention.

In addition to generating the first and second texture information 44 and 46 from the vertex parameters 30, pixel location information 42, for a given pixel location, is generated based on the x and y parameters 36. As previously mentioned, the x and y parameters indicate the particular pixel location with respect to two dimensional space of the computer screen. As shown, the pixel location 42 is centered within the object element 50 while another pixel location 43 is shown to the right is of the pixel location 42. The pixel location 43 is determined from the vertex parameters 30 in a similar manner as the pixel location 42.

The first texture information 44 and second texture information 46 are blended together, via a blending function 48, to produce blended information. The blending function 48 may be $\Sigma(\text{texel}_i)^* x_i$ where $\Sigma x_i = 1$ and where x is at least one of: a constant, a variable, and a function when the texel information is a plurality of texel and may be (first texture information)*x+(second texture information)*(1−x), where x is at least one of a constant, a variable, or a function when the texel information is a texture map. From the blended information of the first and second texture information 44 and 46 and the image data of the object element 50, the object element 50 is rendered on a pixel by pixel basis. As shown, the rendered pixel information 52 is a combination of the image data at pixel location 42 and the blended first and second texture information at the corresponding pixel location. This process continues for each pixel location within object element 50.

FIG. 3 illustrates a graphical representation of two images being morphed together. A first image is represented by first texture information 60 and the second image is represented by second texture information 62. The two images are blended, over time, by a blending function 64 to produce the morphed image 66. The blending function may be, at a given pixel location: (first texture information)*x+(second texture information)*(1−x), where x is at least one of the constant, a variable or a function. In the morphing process, x will most likely be a variable or a function where the blending of the two images will change over time. For example, initially one of the images will be most prominent in the morphed image 66. As time passes, the other image will become more and more prevalent until it is the only image being presented.

Figure 4:
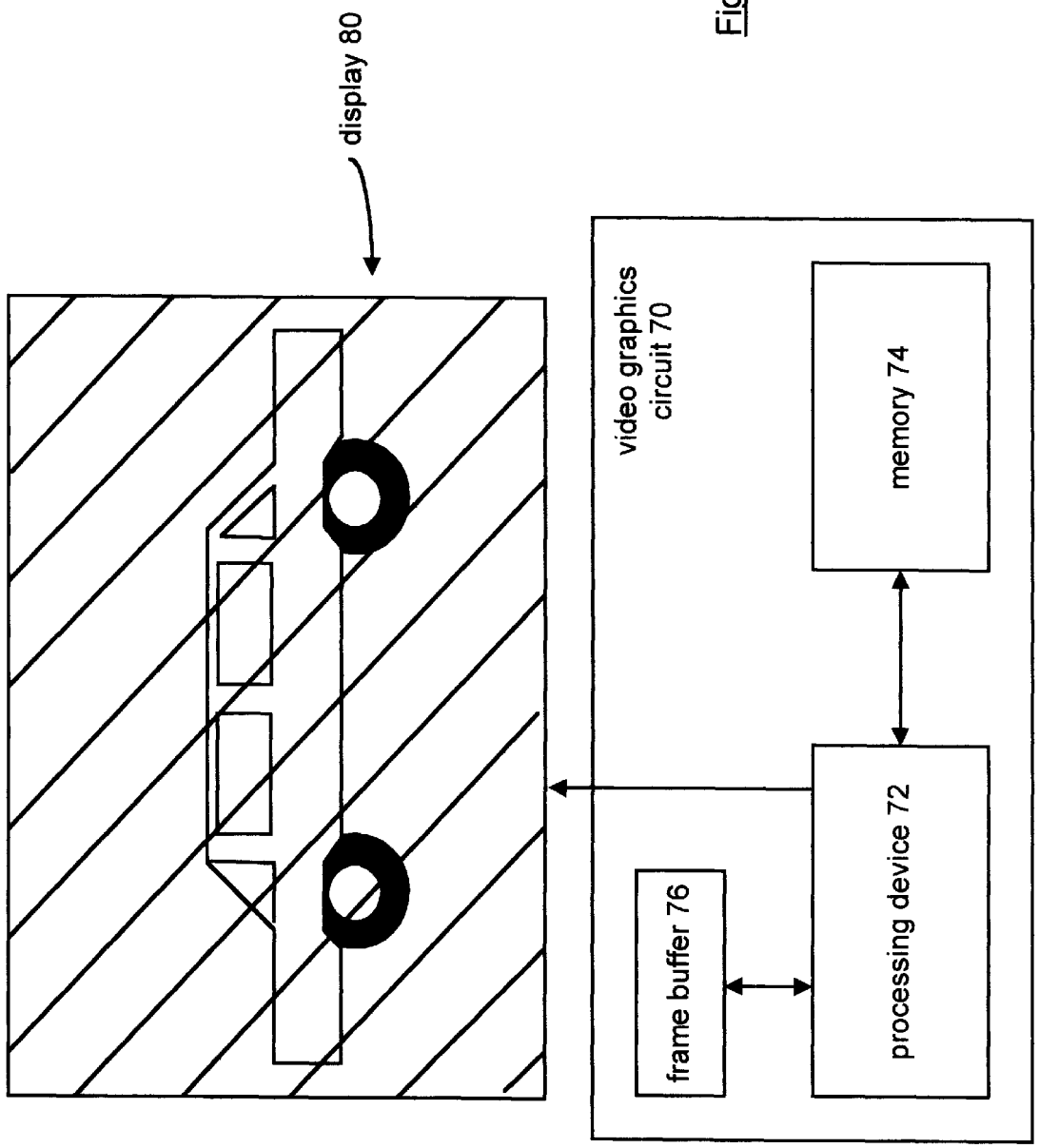
FIG. 4 illustrates a system which is in accordance with the present invention.

FIG. 4 illustrates a schematic block diagram of a video graphics circuit 70 which may be incorporated in a computer system, a television system, and/or a video game processor. The video graphics circuit 70 includes a frame buffer 76, a processing device 72, and memory 74. Memory 74 includes programming instructions such that, when invoked by the processing device 72, the processing device may perform the logical operations illustrated in any of FIGS. 5 through 9. The processing device 72 may be a portion of the CPU, a microprocessor, microcontroller, microcomputer, or digital signal processor.

In operation, the processing device 72, upon invoking one of the video rendering algorithms, blends first and second texture information based on a blending function to produce blended texture information. The processing device 72 then renders an image based on the blended texture information and image information. The resulting rendered image is stored in the frame buffer 76, for subsequent display on display 80. The rendered image stored in the frame buffer 76 may be the morphed image of FIG. 3, or the rendered image 26 of FIG. 1.

Figure 5:
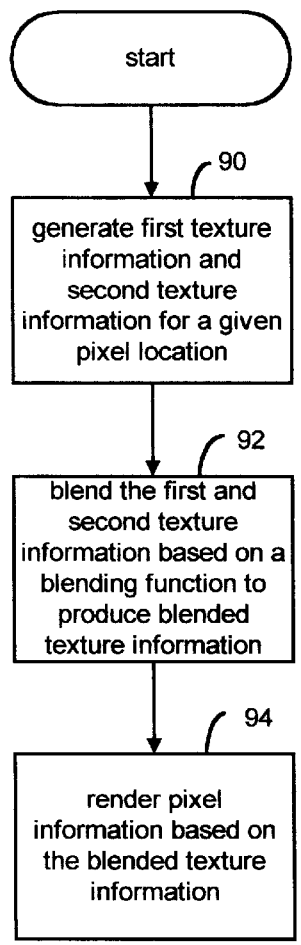
FIG. 5 illustrates a logic diagram that may be used to blend texture information in accordance with the present invention.

FIG. 5 illustrates a logic diagram that may be performed by the video graphics processing circuit. The process begins at step 90 where first and second texture information is generated for a given pixel location. The first and second texture information may be separate texture maps generated from vertex parameters. Having generated the first and second texture information, the process proceeds to step 92 where the first and second texture information are blended based on a blending function to produce blended texture information. The blending function may be $\Sigma(texel_i)*x_i$ where $\Sigma x_i=1$ and where x is at least one of: a constant, a variable, and a function when the texel information is a plurality of texel and may be (first texture information)*x+ (second texture information)*(1-x), where x is at least one of a constant, a variable, or a function when the texel information is a texture map.

Having done this, the process proceeds to step 94 where pixel information is rendered based on the blended texture information and image information, or data. The rendered pixel information is then stored in a frame buffer for subsequent display on a computer screen, or the like.

Figure 6:
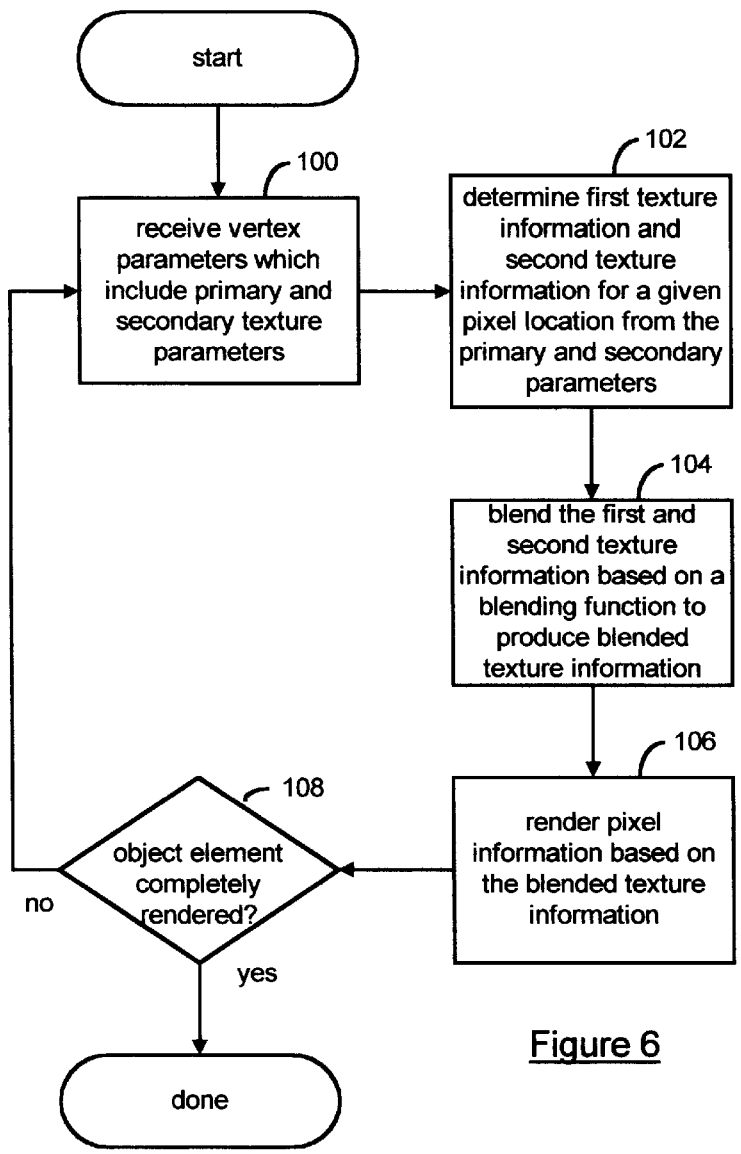
FIG. 6 illustrates another logic diagram for blending texture information in accordance with the present invention.

FIG. 6 illustrates a logic diagram for rendering pixel information from blended texture information which may be performed by the video graphics circuit. The process begins at step 100 where vertex parameters are received, wherein the vertex parameters include primary and secondary texture parameters. The process then proceeds to step 102 where first and second texture information is determined for a given pixel location from the primary and secondary parameters. Having done this, the process proceeds to step 104 where the first and second texture information are blended based on a blending function to produce blended texture information.

From the blended texture information and image information, pixel information is rendered at step 106. The process then proceeds to step 108 where a determination is made as to whether an object element is completely rendered. If so, the process is complete for this particular object element. If not, the process reverts back to step 100 for processing of pixel information for other pixel locations of the object element.

FIG. 7 illustrates a logic diagram which may be performed by the video graphics processor to render pixel information. The process begins at step 110 where a plurality of texels are generated for a given pixel location. The process then proceeds to step 112 where the plurality of texels are blended based on a blending function to produce blended texels. Such a blending function may be $\Sigma(texel_i)*x_i$ where $\Sigma x_i=1$ and where x is at least one of: a constant, a variable, and a function. The process then proceeds to step 114 where pixel information is rendered from the blended texels and image information.

FIG. 8 illustrates another logic diagram which may be performed by the video graphics processor to morph at least two images together. The process begins at step 120 where first texture information is generated for a first image of at least two images. In addition, second texture information for a second image of the at least two images is also generated. Both the first and second texture information are generated for a given pixel location. Having done this, the process proceeds to step 122 where the first and second texture information are blended based on a blending function to produce blended texture information. Having done this, the process proceeds to step 124 where pixel information is rendered from the blended texture information and image information.

FIG. 9 illustrates a logic diagram which the video graphics processor may execute to render pixel information. The process begins at step 130 where first and second texture information for a given pixel location is generated. Having done this, the process proceeds to step 132 where pixel information is rendered based on a blending function that blends the first and second texture information together. Note that the logic diagram of FIG. 9 does not include a separate blending step. The blending and rendering of the image data is done in a single step to produce the pixel information.

The preceding discussion has presented a method and apparatus for blending texture information from at least two separate sources. Such sources may be texture maps, or a plurality of texels. As one skilled in the art will readily appreciate, the present invention may blend more than two texture maps in a single step to achieve the same results. Regardless of the number of different texture maps being blended, the writing to the frame buffer is done once, thereby improving the overall efficiency of a computer system.

What is claimed is:

1. A method for rendering pixel information for a given pixel location, the method comprising the steps of:

a) retrieving first texture information from at least a portion of a first texture map of a first image and second texture information from at least a portion of a second texture map of a second image for the given pixel location;

b) blending the first and second texture information based on a blending function to produce blended texture information; and c) rendering the pixel information from the blended texture information.

2. The method of claim 1 further comprises:

receiving vertex parameters which include primary and secondary texture parameters; and determining the first and second texture information based on the primary and secondary texture parameters.

3. The method of claim 1 further comprises determining the given pixel location based on x and y parameters of vertex parameters.

4. The method of claim 1 further comprises, within step (b), utilizing, as the blending function, a function of (first texture information) *x+(second texture information)*(1-x), where x is at least one of: a constant, a variable, and a function.

5. The method of claim 1 further comprises utilizing at least one of: color, pattern, highlights, reflections, clouding, separate object, and shading as the first texture information.

6. The method of claim 1 further comprises utilizing at least one of: color, pattern, highlights, reflections, clouding, separate object, and shading as the second texture information.

7. The method of claim 1 further comprises repeating steps (a) through (c) for another pixel location of an object element.

8. A method for rendering pixel information for a given pixel location of an object element, the method comprising the steps of:

a) retrieving a plurality of texels from at least two different texture maps of at least two different images for the given pixel location;

b) blending the plurality of texels based on a blending function to produce a blended texel; and c) rendering the pixel information from the blended texel.

9. The method of claim 8 further comprises:

receiving vertex parameters which include a plurality of texture parameters; and determining the plurality of texels based on the plurality of texture parameters.

10. The method of claim 8 further comprises, within step (b), utilizing, as the blending function, a function of: $\Sigma(texel_i) * x_i$ where $\Sigma x_i = 1$ and where x is at least one of: a constant, a variable, and a function.

11. The method of claim 8 further comprises repeating steps (a) through (c) for another pixel location of the object element.

12. A method for morphing at least two images, at a given pixel location, to produce pixel information, the method comprising the steps of:

a) retrieving first texture information for a first image of the at least two images and second texture information for a second image of the at least two images based on the given pixel location, wherein the first image is stored within at least a portion of a first texture map and the second image is stored within at least a portion of a second texture map;

b) blending the first and second texture information based on a blending function to produce blended texture information; and c) rendering the pixel information from the blended texture information.

13. The method of claim 12 further comprises:

receiving vertex parameters which include first and second image texture parameters; and determining the first and second texture information based on the first and second image texture parameters.

14. The method of claim 12 further comprises, within step (b), utilizing, as the blending function, a function of: (first texture information) *x+(second texture information)*(1−x), where x is at least one of: a constant, a variable, and a function.

15. The method of claim 12 further comprises repeating steps (a) through (c) for another pixel location of the at least two images.

16. A video graphic processor comprising:

a processing device; and memory operably coupled to the processing device, wherein the memory stores programming instructions that, when read by the processing device, causes the processing device to (a) retrieve first texture information from at least a portion of a first texture map of a first image and second texture information from at least a portion of a second texture map of a second image for the given pixel location; (b) blend the first and second texture information based on a blending function to produce blended texture information; and (c) render pixel information from the blended texture information.

17. A video graphic processor comprising:

a processing device; and memory operably coupled to the processing device, wherein the memory stores programming instructions that, when read by the processing device, causes the processing device to (a) retrieve a plurality of texels from at least two different texture maps of at least two different images for the given pixel location; (b) blend the plurality of texels based on a blending function to produce a blended texel; and (c) render pixel information from the blended texel.

18. A video graphic processor comprising:

a processing device; and memory operably coupled to the processing device, wherein the memory stores programming instructions that, when read by the processing device, causes the processing device to (a) retrieve first texture information for a first image of at least two images and second texture information for a second image of at least two images based on given pixel location, wherein the first image is stored within at least a portion of a first texture map and the second image is stored within at least a portion of a second texture map; (b) blend the first and second texture information based on a blending function to produce blended texture information; and (c) render pixel information from the blended texture information.

* * * * *